United States Statutory Invention Registration [19]

[11] Reg. Number: H820

Smoot [43] Published: Sep. 4, 1990

[54] INFRARED SAFETY BEACON

[76] Inventor: Wayne A. Smoot, 12871 Laurel Hills Dr., Woodbridge, Va. 22192

[21] Appl. No.: 359,601

[22] Filed: Jun. 1, 1989

[51] Int. Cl.[5] ..... G01J 1/00

[52] U.S. Cl. ..... 250/504 R

[58] Field of Search ..... 250/503.1, 504 R, 493.1; 362/277, 319, 351

[56] References Cited

U.S. PATENT DOCUMENTS 4,575,786 3/1986 Roberts ..... 362/279

4,816,694 3/1989 Kuppenheimer et al. ..... 250/504 R

*Primary Examiner*—Thomas H. Tarcza

*Assistant Examiner*—Linda J. Wallace

[57] ABSTRACT

An infrared safety beacon apparatus used on manned U.S. Army vehicles during live fire training exercises to distinguish them from heated silouette targets when exercise personnel use infrared viewers to observe the accuracy of fired rounds hitting the silouette targets. The apparatus includes a cylindrical shaped heater fixed to a vertical hollow tube attached to the tank. The infrared radiation emittal from the heater toward a viewer is controlled by a rotating cylindrically shaped chopper positioned over the heater. The chopper has openings over about one half of the circumference to provide intermittent flashes of infrared spectrum energy toward the viewer. The flashes are easily distinguishable from the steady infrared spectrum emitted from the silouette targets.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INFRARED SAFETY BEACON

The invention described herein may be manufactured, used, and licensed by the U.S. Government for governmental purposes without the payment of any royalties thereon.

BACKGROUND OF INVENTION

Presently, there is no apparatus used to identify manned vehicles, such as tanks, from simulated tanks in the form of heated tank silouette targets used in gunnery practice. The tank crews have depended on being oriented in the direction of the heated silouette targets during live firing practice. However, if one of the gunnery practice tanks strays off the established firing fan, that tank will show a heated target very similar to the heated silouette tank targets. Manned tanks have been fired on under these circumstances.

An apparatus is needed to identify the manned tanks for safety reasons while operating in or near the live firing range.

SUMMARTY OF THE INVENTION

The present infrared (IR) safety beacon is mountable on manned tanks used during live fire training exercises in easy view of other participants using IR viewers. The safety beacon is easily mountable on the antenna tuning unit mount, which is a vertical hollow tube, on the rear of a U.S. Army tank turret.

The IR safety beacon is comprised of an open central passage cylindrical IR generating heater means mounted on the outer portion of the hollow tube at the top with electrical leads therefrom through the hollow part of the tube to an internal power supply in the tank. A rotatable thermal chopper means, preferably a cylindrical metal can having openings over about half of the circumference, is placed over said heater means and is rotated by a motor means to provide intermittent flashes of infrared energy through the openings for observaebce by the opeators of IR viewers, such as the tank thermal sight. Thes intermittent flashes of IR energy distinguish the manned tanks from the heated silouette tank targets which only produce steady IR emissions and which are used for target practice in the live firing exercises.

The motor means is preferably a small cylindrical motor that fits into the top of the hollow tube and is supported by a flange resting on the top edge of the tube. Electrifal leads connected to the motor feed through the hollow part of the tube to an internal power source in the tank. A motor drive shaft extends outward from the flange and is rotatable about bearing means in the flange. Also a spacer, such as a split collar spacer, surrounds the motor to fill the space between the motor and the inside walls of the hollow tube. The spacer is evently compressed around the motor by a spacer set screw that is threadable through the tube and against the spacer.

The IR generating heater means is preferably comprised of an open central passage cylindrical metallic support housing with circular flanges on each end and a hole in the center of the housing between the passage and the exterior of the housing through which electrical leads pass an are electrically connected to a Mylar strip heater epoxied into the exterior of the housing between the flanges. The support housing with heater may be mounted on the top portion of the hollow tube by sliding the passage over the motor flanges, which are flush with the outside diameter of the hollow tube, and down on the tube. The support housing with heater are attached to the tube by set screws threading through the housing flanges and against the tube. The metallic support housing is preferably made of aluminum.

The cylindrical metal can is preferably made of aluminum and is cylindrical in shape and has a plurality of elongaed openings over about one half of its circumference. The can is longer than the heater element and preferaby has a diameter about three times the diameter of the heater element. The can has a circulr opening on the bottom slightly larger than the outside diameter of the heater element for slipping over the heater element. A bushing having a circulr opening just slightly larger than the outside diameter of the tube is screw threadably attahed to the bottom of the can after the can is slipped over the heater. The bushing is needed to prevent possible wobble of the can when the can is being rotaed by the motor. Preferably the bushing is two identical halves of a flat Teflon bushing wherein each half has an open semicircular cutout slightly larger than the outside diameter of the tube and is screw threadably attached to the metal can. The top of the can has a centrally positioned external dome forming an internal cavity. The internal cavity has a circular opening preferably with one flat face which mates with the motor drive shaft and into which the drive shaft enters. The external dome has a screw threadable hole therethrough ending at the flat face of the internal cavity opening. The drive shaft is firmly attached to the can in the internal cavity by threading a screw through the dome onto the flat side of the drive shaft.

The invention will be better understood by reference to the detailed description when considered in conjuction with the drawings.

DETAILED DESCRIPTION OF THE PREFERRED EMBODIMENT

Figure 1:
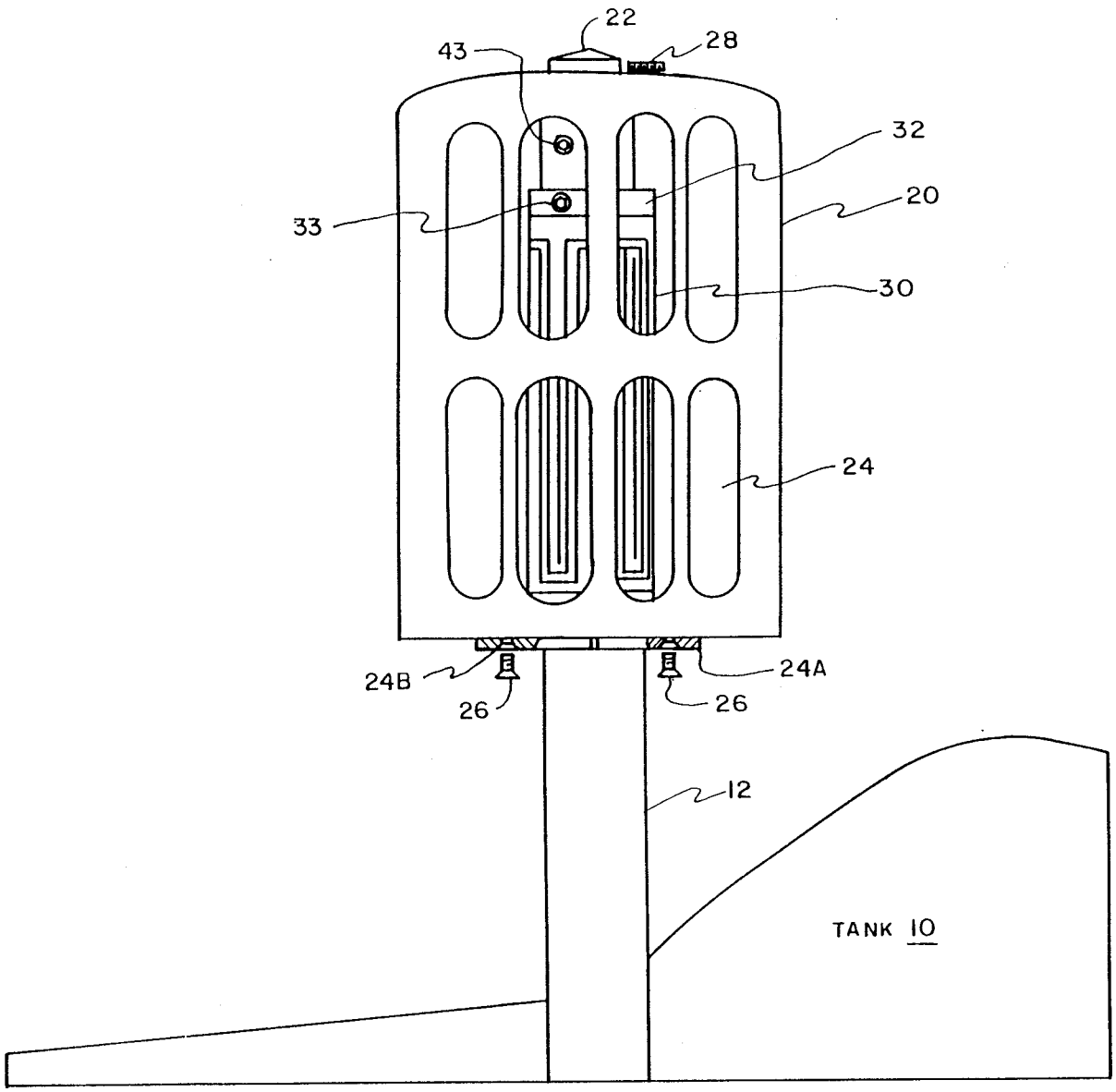
FIG. 1 depicts a close-up perspective view of the heater means and rotatable thermal chopper means.
Figure 2:
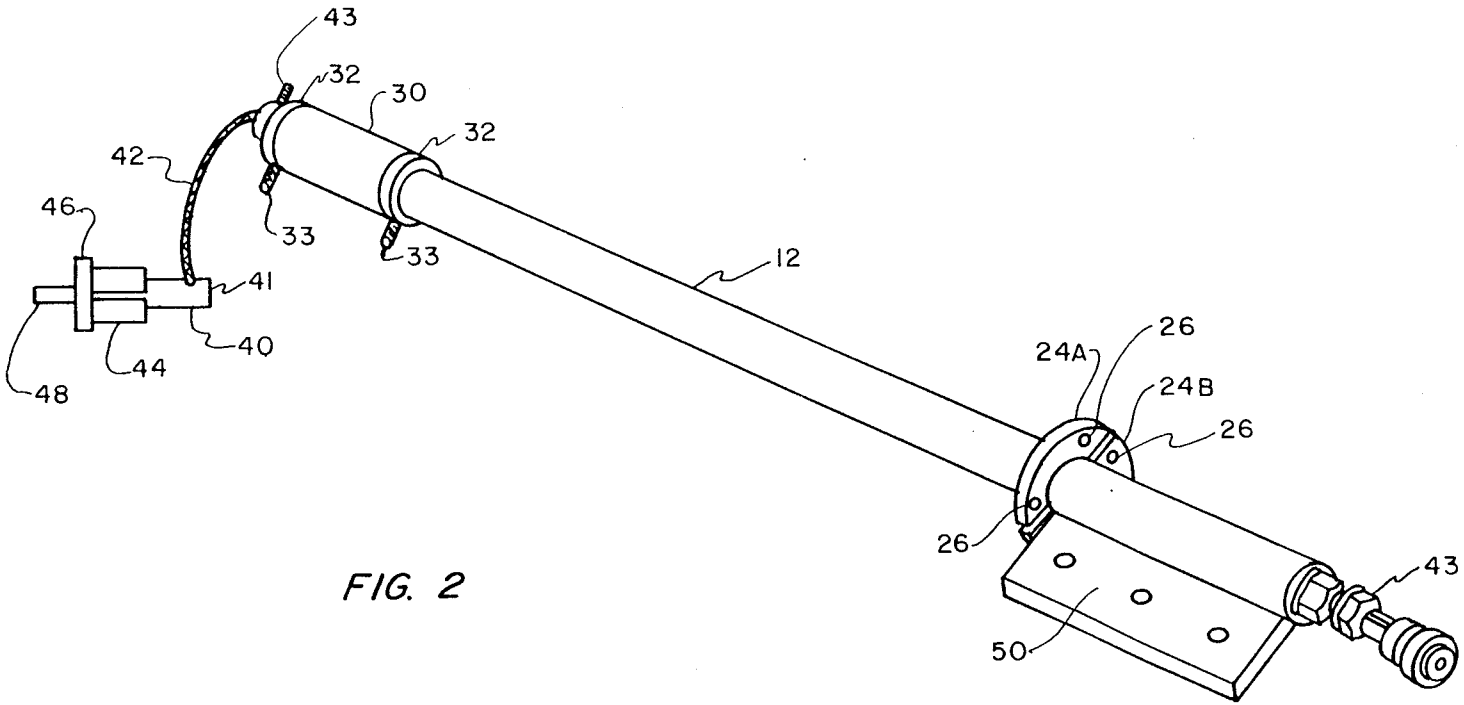
FIG. 2 illustrates the mount for attaching to a tank and the heater and a small motor drive for the chopper means.
Figure 3:
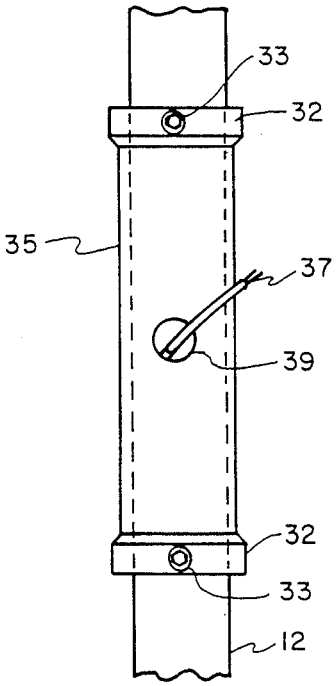
FIG. 3 illustrates the support housing for the heater.

Refer to FIGS. 1 and 2 for an explanation of the IR safety beacon as mounted on a tank 10 portion. The beacon is mounted on a hollow tube 12 which is attached vertically to the tank at a mounting block 50. Tube 12 and block 50 are preferably made of aluminum. The heater means 30 is mounted on a cylindrical support housing, with circular flanges 32 on each end and a recessed base portion 35 into which heater means 30 is mountable (FIG. 3). The support housing is also preferably made of aluminum. Housing 32 has an open central passage that fits over the outer portion of tube 12 near the top of 12. Housing 32 is attached to 12 by heater housing set screw 33 at the upper and lower ends of 32 which hold 32 firmly at 12.

FIG. 3 illustrates housing 32 and the screws 33 at each end mounting 32 to 12. The heater means 30 is not as yet present in the housing recessed base portion 35. Electrical leads 37 are extended out a hollow port 39 in the center of the housing 32 to be attached to Mylar strip heater filsm that are laid on base 35. The other end of electrical leads 37 ar run back through an opening in tibe 12 (not shown) to the above mentioned internal power supply. The internal tank power supply is 24 volts DC. Preferably the heater means is comprised of having an entire housing base 35 epoxied and then a layer of Mylar, a heating strip with leads 37 attached thereto, and a front layer of Mylar added to the epoxied base. The pattern of the strips may be chosen as desired. Heater 30 may be brought off the shelf from Minco Products Inc., part number HK5510-105 and epoxied in recessed base portion 35 and to leads 37. Specifications of this heater are 4 amps current at 120 watts, generating a temperature of 260° F.

Since the silouette targets of tanks emit a steady IR image, the present IR safety beacon needs a thermal chopper means to provide intermittent flashes of IR energy to identify the tank as being manned. The preferred chopper means is a rotatable metal can 20 made of aluminum. The can 12 may have openings over about one half of the circumference, preferably in the form of a plurality of elongated vertical openings 24. Can 12 has a circular opening at the bottom with an inside diameter slightly larger than the outside diameter of heater supporth housing 32 where can 20 may be mounted after the heater means 30 is attached. A bushing, having an opening just slightly larger than the outside diameter of tube 12, is attached to the bottom of 20. The bushing is preferably two equal flat Teflon half circle busings 24A and 24B in which each bushing has an open semicircle cutout that fits loosely around 12 and are connected to the bottom of can 20 preferably by a plurality of 6–32 flat head screws 26.

Can 20 also has a central positioned external dome 22 with a screw threadable hole therethrough into which a motor shaft screw 28 threadably fits. Screw 28 is preferably a 8–32 set screw. An internal cavity (not shown) inside dome 22 is comprised of a circular opening with one flat side into which screw 28 enters. The circular opening is the drive point from a motor drive shaft 48 discussed more fully with reference to FIGS. 2 and 4.

Figure 4:
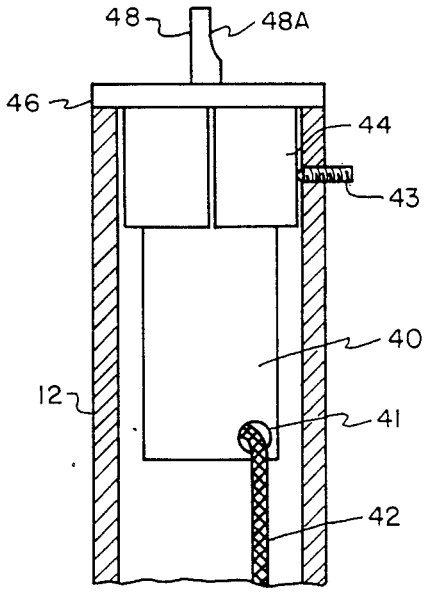
FIG. 4 is a partial sectional view of the motor means as attached to the top of the hollow tube.

Refer now to FIGS. 2 and 4 for a better understanding of the motor means 40 as used in a present safety beacon. Electrical motor means 40 is available commercially. One example of a motor that may be used is part number 43A143-4 made by TRW Globe Motors. This motor is rated at 0.6 amps current at 27 volts DC and rotates a drive shaft at 120 PRMs. Motor means 40 is supported within the hollow portion of tube 12 by a split collar spacer 44 and a flange 47, which is flush with the outside diameter of 12. A motor spacer set screw 43, preferably of size 8–32, is screw threadable through tube 12 against spacer 44 and expands 44 against the inside hollow wall of 12. Motor means has an electrical cable 42 leading from 40 at port 41 back through the hollow portion of 12 to the above mentioned 24 volt DC power supply inside the tank. Electrical cable 42 from motor 40 and electrical cable 37 from heater 30 are included in a cable plug 43, such as a channel plug, which connects to the power supply. A drive shaft 48, having a flat side 48A, is insertable into the circular opening of 20 wherein the motor shaft set screw 28 tightens down on 48A. Since motor 40 rotates the shaft 48 at 120 RPM the safety beacon flashes two times per second as the elongated openings 24 in can 20 are rotated past an observer using a thermal viewer. The beacon has 360 degrees visibility. The IR viewer, or tank thermal sight, is effected for observing the flashing beacon out to three kilometers or more.

I claim:

1. An infrared safety beacon mountable on a tank during live fire training exercise for monitoring by an infrared viewer, said safety beacon comprised of:

infrared generating heater means mounted on the top outer cylindrical portion of a vertical hollow tube attached to a manned tank, said heater means having electrial leads leading through said hollow tube to an internal power supply in said tank;

rotatable thermal chopper means comprised of a cylindrical housing surrounding said heater means, said cylindrical housing having openings over about one half of the circumference; and motor means for rotating said chopper means, said motor means supported within the upper portion of said hollow tube by a split collar spacr and a flange built around said motor means whose outside diameter is flush with the outside diameter of said hollow tube, said motor means having a power connection through said hollow tube to said tank internal power supply and a drive shaft extending out from said flange and rotatable about bearing means in said flange, wherein said thermal chopper means is rotated around said heater means to provide intermittent flashes of infrared energy to said infrared viewer to identify said tank as a manned vehcile rather than a steady infrared emitting heated silouette target useed in live fire training exercises.

2. A safety beacon as set forth in claim 1 wherein said heater means is comprised of an open central passage cylindrical metallic support housing with circular flanges on each end and a recessed base portion therebetween and a hole in the center of said recessed base portion between said passage and the exterior of said support housing through which said electrical leads pass and are electrically connected to a Mylar strip heater epoxied into said exterior of said suppport housing between said flanges wherein said support housing mounts over the end of said hollow tube by screw threadable attachment means through said flanges to said hollow tube.

3. A safety beacons as set forth in claim 2 wherein said rotatable thermal chopper means is comprised of a metal can having a circular opening on the bottom that fits over said heater means and a busing having an inside diameter slightly larger than the outside diameter of said hollow tube that is screw threadably attached to the bottom of said metal can and said openings are a plurality of vertical elongated openings and a centrally positioned external dome with a screw threadable hole therethrough on an upper side thereof going to an internal cavity having a circular opening and one flat face in which said motor means drive shaft is circular with one flat side and fits within said cavity wherein said drive shaft is firmly attached to said metal can by threading a motor shaft set screw through said dome screw threadable hole against said flat side of said drive shaft.

4. A safety beacon as set forth in claim 3 wherein said motor means rotates said metal can at a synchronous speed of 120 revolutions per minute.

5. A safety beacon as set forth in claim 4 wherein said bushing which is screw threadably attached to the bottom of said metal can is two identical halves of a flat Teflon bushing wherein each half is screw threadably attached to said metal can.

6. A safety beacon as set forth in claim 5 wherein said metal can is aluminum.

7. A safety beacon as set forth in claim 2 wherein said heater means support housing is aluminum.

* * * * *